United States Patent Office 3,213,158
Patented Oct. 19, 1965

3,213,158
THERMALLY STABLE COMPOSITIONS COMPRISING POLYOXYMETHYLENE AND PARTIALLY CURED EPOXY RESIN
Seizaburo Sakakibara, Hiroshi Aoki, and Michichika Kuwabara, Yamaguchi-ken, Japan, assignors to Teikoku Jinzo Kenshi Kabushiki Kaisha, Osaka, Japan, a corporation of Japan
No Drawing. Filed Mar. 28, 1961, Ser. No. 98,787
Claims priority, application Japan, Mar. 31, 1960, 35/10,490
3 Claims. (Cl. 260—830)

The present invention relates to a resinous composition having increased thermal stability. More particularly, the invention relates to a thermally stable resinous composition substantially consisting of polyoxymethylene or the derivatives thereof, and an epoxy resin partially cured with an amino group containing compound.

The object of the present invention is to provide a resinous composition having as its chief component polyoxymethylene or the derivatives thereof, said composition being capable of producing shaped articles such as films, fibers, filaments and other moulded articles which are tough and have good thermal stability.

Another object of the invention is to provide a resinous composition having as its chief component polyoxymethylene or the derivatives thereof, and having high degree of stability against the heating during the shaping operations.

Still another object of the present invention is to provide a process for increasing thermal stability of polyoxymethylene and the derivatives thereof, and to provide an additive for the purpose.

Further objects and advantages of this invention shall be clear from the following descriptions.

Heretofore it has been known that by polymerizing formaldehyde in substantially anhydrous condition under the presence of a catalyst and optional presence of a solvent, polymers of formaldehyde can be obtained, and also that among such polymers, that which has an intrinsic viscosity of at least 0.6, measured at 60° C. in p-chlorophenol containing 2% α-pinene (hereinafter shall be referred to merely as "an intrinsic viscosity" or $[\eta]$), and which has a reaction rate constant for thermal degradation at 222° C. of less than 15% by weight per minute, comes to possess physical and chemical properties sufficient for practical use as a general synthetic resin.

This formaldehyde polymer which has an intrinsic viscosity of at least 0.6 and a reaction rate constant for thermal degradation at 222° C. of less than 15% by weight per minute shall be called in the present specification hereafter "polyoxymethylene."

Further, the above "reaction rate constant for thermal degradation" is a numerical value which indicates the degree of thermal stability of polyoxymethylene. It is obtained by placing the subject polymer in a well cleaned syringe, sealing the syringe, heating the syringe by suspending it in a bath of methyl salicylate vapor maintained at 222° C., and measuring the degradation rate of the polyoxymethylene per minute using the unit of percent/min. Therefore, the less is the reaction rate constant for thermal degradation, the greater is the thermal stability of the polyoxymethylene, and vice versa.

And, polyoxymethylene has a general formula of $(CH_2O)_n$, usually its end groups being believed to be hydroxyl groups. Presumably due to the presence of the hydroxyl groups as its end groups, polyoxymethylene is normally inferior in thermal stability, and if left untreated, presents serious difficulty in its heat-shaping operations to be made into a commercially valuable shaped structure.

For this reason there were such attempts in the past as subjecting polyoxymethylene to esterification or etherification, or reacting the same with an organic isocyanate to convert it to a urethane, thereby rendering the terminal hydroxyl groups of polyoxymethylene inactive to obtain polyoxymethylene derivatives of improved thermal stability. (These derivatives shall be referred to in this specification hereafter "polyoxymethylene derivatives.")

Such polyoxymethylene derivatives admittedly possess a better thermal stability than polyoxymethylene by certain degree. However, it being virtually impossible to completely esterify or etherify all the terminal hydroxyl groups of polyoxymethylene, or to convert it completely to a urethane, the resulting polyoxymethylene derivatives should be regarded as still containing hydroxyl groups at a minor rate.

Also, in the actual heat-shaping operations, such polyoxymethylene derivatives are often decomposed by the heat, and therefore more of the hydroxyl groups will appear in the polymer during said operations.

From the foregoing reasons, such polyoxymethylene derivatives still cannot be said to be satisfactory for practical use.

According to the present invention, a resinous composition is provided which is characterized by that, it contains a high molecular substance selected from the group consisting of polyoxymethylene and the derivatives thereof, and a partially cured epoxy resin in an amount of 0.5–20% based on the weight of said high molecular substance, said partially cured epoxy resin having been obtained by curing an uncured epoxy resin with an amino group containing compound in the amount sufficient for curing 2–80%, preferably 5–50%, of the epoxy groups contained in said uncured epoxy resin. The thermal stability of said resinous composition is far greater than that of polyoxymethylene or its derivatives.

As the uncured epoxy resins to be used as the materials for the partially cured epoxy resins employed in the present invention, such epoxy compounds having a molecular weight above 150, particularly 250–4,000, which has been obtained from the reaction between a compound having at least two phenolic hydroxyl groups and an epihalohydrin such as epichlorohydrin, may be named.

A typical example of said compound containing at least two phenolic hydroxyl groups is bis-(4-hydroxyphenyl)-dimethylmethane having the following general formula:

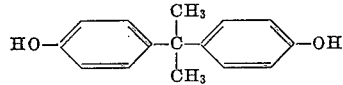

Besides the above, any other compounds which are capable of reacting with an epihalohydrin such as dihydroxy diphenyl, bis-(hydroxyphenyl)-methane, bis-(hydroxyphenyl)-ethane, and p-bis-(hydroxyphenyl)-benzene to form a high molecular reaction product of molecular weight of above 150, particularly 250–4,000 may be used.

As the amino group containing compounds employed for curing the uncured epoxy resins, the following may be named.

(a) MONOAMINES

Aliphatic primary monoamines of 1–12 carbons, such as methylamine and ethylamine; aromatic primary monoamines such as aniline and toluidine; cycloaliphatic primary monoamines such as cyclohexylamine; and aminoalcohols such as monoethanolamine and aminophenol.

(b) DIAMINES

Aliphatic diamines of 2–6 carbon atoms such as ethylenediamine and trimethylenediamine; aromatic diamines such as o-, m-, and p-phenylenediamine, toluylenediamine, p,p'-diaminodiphenylmethane and p,p'-diaminodiphenylsulfone; cycloaliphatic diamines such as diaminocyclohexane; N-monoalkyl substituted diamines of the above (in such a case, secondary amine) and the derivatives thereof such as the foregoing diamines added with ethyleneoxide; and heterocyclic diamines such as piperadine.

(c) POLYAMINES

Polyamines such as diethylene triamine, triethylenetetramine, diphenylenetriamine, and their N-alkyl substituted compounds.

Thus, any of the amino group containing compounds which contain as a whole at least two active hydrogen atoms bonded with at least one nitrogen atom is useful in this invention. That is, the amino group containing compound used in this invention may contain at least one —NH$_2$, or at least two

groups wherein R is an organic radical.

The partially cured epoxy resin used in this invention is that which is obtained by curing the aforesaid uncured epoxy resin partially with the aforesaid amino group containing compound in an amount sufficient to react with 2–80%, preferably 5–50%, of the epoxy groups contained in said uncured epoxy resin.

The method of curing is as follows: the reactants are dissolved in an organic solvent such as hydrocarbons, ketones, ethers, which are non-reactive with both epoxycompounds and aforesaid amino group containing compounds but can dissolve the two, and reacted normally under heating. In some cases reaction may be carried out in the absence of solvent.

In this invention, in case a solvent is used in the aforesaid curing step, the partially cured epoxy compound may be removed of the solvent by evaporation under atmospheric or reduced pressure at a room temperature or an elevated temperature, and thereafter may be mixed with polyoxymethylene or its derivatives. It is also possible to mix the epoxy compound as dissolved in the solvent with the polyoxymethylene or its derivatives, and thereafter remove the solvent by evaporation.

In case no solvent is used in the curing, the mixing may be effected directly, or the partially cured epoxy resin may be first made into a solution and then mixed with polyoxymethylene and its derivatives, followed by the removal of the solvent by evaporation.

If the partially cured epoxy resin is obtained in solid form, this and the polyoxymethylene or its derivatives are recommended to be pulverized in advance of their mixing, or the mixing may be carried out while they are being pulverized together in a mill such as ball mill.

The advantages of the present composition is clearly observed when the same is heated and moulded. For instance, the composition shows excellent thermal stability not only during the moulding operations thereof into such as pellet, film, filaments, fibers and other moulded articles, but also these shaped articles all display high thermal stability.

The reason why the present resinous composition has such excellent thermal stability is believed to be that, when polyoxymethylene or its derivatives is mixed with a partially cured epoxy resin;

(1) The nitrogen atoms in said partially cured epoxy resin function as the acceptor of the oxygen in the air which causes automatic oxidation of polyoxymethylene or its derivatives, and (2) By the mutual reaction of the remaining hydroxyl groups in the polyoxymethylene or its derivatives with the epoxy groups remaining in the partially cured epoxy resin, said hydroxyl groups are made inactive thereby the polyoxymethylene or its derivatives is made more stable compounds.

Accordingly it is extremely important that said partially cured epoxy resin used in this invention should contain suitable numbers of nitrogen atoms and epoxy groups. By our experiments, when the degree of curing by said amino group containing compound is less than 2% of the total epoxy groups contained in the epoxy resin, the function described in (1) above is lowered. On the other hand, if the degree exceeds 80%, because the remaining epoxy groups in the partially cured resin become insufficient in the amount, the function in (2) above is impaired. Therefore in both cases the thermally stable property of the resinous composition obtained is unsatisfactory.

Again if the degree of partial curing of the uncured epoxy resin is either below 2% or above 80% of the contained epoxy groups, in the former case usually the melting point of the partially cured epoxy resin obtained is lowered, while in the latter case the melting point tends to become unduly high. Thus the melting point of the partially cured epoxy resin is considerably affected by the degree of curing as aforesaid, the molecular weight of said resin of course having some influence thereon.

Again the epoxy resin with its 2–80%, particularly 5–50%, of epoxy groups cured by an amino group containing compound, such as used in the present invention, appears also suitable from the standpoint of its affinity with the polyoxymethylene or its derivatives.

The reason for blending the above-described partially cured epoxy resin in an amount of 0.5–20% by weight based on the polyoxymethylene or its derivatives is that, as shown in Tables I and II of Examples 1 and 2, respectively, within so specified range the reaction rate constant for thermal degradation is reduced drastically, indicating the improvement in thermal stability of the polyoxymethylene or its derivatives.

There is also found a very interesting fact that, in case the blending ratio of the partially cured epoxy resin exceeds 20% by weight based on the polyoxymethylene or its derivatives, the thermal stability of the product is, on the contrary, lowered.

As so far explained, in this invention its characteristics residing in that a partially cured epoxy resin is caused to contain suitable numbers of nitrogen atoms and epoxy groups, said epoxy resin is not necessarily limited to the epoxy resins obtained by the reaction between an epihalohydrin and a compound containing at least two phenolic hydroxyl groups as set forth in the above, but it may be that, for instance, an epoxy resin obtained by the reaction of an epihalohydrin with a primary amine; that obtained by, for instance, the reaction of an epihalohydrin with a sulfide; or can be epoxy fatty acid esters obtained from fatty acids of 10–24 carbon atoms such as, undecylenic acid, oleic acid, linoleic acid, linolenic acid, erucic acid and fish oil fatty acid.

Further into the resinous composition of the present invention other additives may be incorporated in a suitable ratio according to the practice of those who are skilled in the art, for instance a photostabilizer such as a benzophenone derivative, a phenol-type or catechol type anti-oxidant, a filler as well as a coloring agent such as titanium dioxide, and pigments.

The examples of this invention shall be given hereinbelow, it being understood that the following is only for illustration purpose, and therefore the scope of this invention is by no means thereby limited.

*Example 1*

Powdered polyoxymethylene having an intrinsic viscosity of 2.75 (measured in p-chlorophenol containing 2% α-pinene at 60° C.; these measuring conditions are common in all of the following examples) was immersed in an acetone solution of a partially cured epoxy resin in various ratios as shown in Table I, and mixed well. Said partially cured epoxy resin had been cured, with acetone as the solvent, by ethylenediamine in an amount sufficient to react with 50% of the theoretical value of the numbers of epoxy groups in the material uncured epoxy resin of an average molecular weight of 900, manufactured from epichlorohydrin and bis-(4-hydroxyphenyl)-dimethylmethane. Said mixture was then removed of the solvent completely by evaporation, first under the atmospheric pressure and subsequently under a reduced pressure of 1 mm. Hg, at 50° C. Thereafter the same was pressed and moulded. The reaction rate constant for thermal degradation was measured by the method using a syringe as aforesaid (this method is common in all of the examples) at 222° C. as to the products of various mixing ratios of the two components. The results were as shown in the Table I below.

TABLE I

| Mixing ratio (wt. percent) | Reaction rate constant for thermal degradation (percent/min.) |
| --- | --- |
| 0 | 3.8 |
| 0.1 | 3.7 |
| 0.5 | 3.2 |
| 1.0 | 2.6 |
| 3.0 | 1.1 |
| 5.0 | 1.1 |
| 10.0 | 1.5 |
| 20.0 | 2.7 |

As is seen from the above table, the polyoxymethylene composition which contains 0.5–20% by weight of the epoxy resin about 50% cured by ethylenediamine has a remarkably improved thermal stability over the material polyoxymethylene.

*Example 2*

Polyoxymethylene diacetate having an intrinsic viscosity of 1.51 was added with a partially cured epoxy resin which had been obtained by reacting uncured epoxy resin of average molecular weight of 1,800 produced from epichlorohydrin and bis-(4-hydroxyphenyl) - dimethylmethane with p-phenylenediamine corresponding to 30% theoretical value of the epoxy groups of said uncured epoxy resin, at the various ratios as shown in Table II, and the two are mixed while being pulverized in a ball mill. Said mixtures were pressed and moulded at room temperature, and their reaction rate constant for thermal degradation was measured. The results were as shown in Table II.

TABLE II

| Mixing ratio (wt. percent) | Reaction rate constant for thermal degradation (percent/min.) |
| --- | --- |
| 0 | 0.8 |
| 0.1 | 0.5 |
| 0.5 | 0.4 |
| 1.0 | 0.3 |
| 3.0 | 0.1 |
| 5.0 | 0.07 |
| 10.0 | 0.1 |
| 20.0 | 0.4 |

As evidenced by the above table, polyoxymethylene-diacetate compositions containing 0.5–20.0% of epoxy resin partially cured by p-phenylene diamine has a remarkably improved thermal stability over the material polyoxymethylene, and yields tough moulded structures without coloring during their heat-moulding operations.

*Example 3*

Two hundred (200) grams of polyoxymethylene having an intrinsic viscosity of 2.75 and a reaction rate constant for thermal degradation of 3.8%/min. (222° C.) was mixed with 5 grams of partially cured epoxy resin, while both being pulverized in a ball mill. Said partially cured epoxy resin had been obtained by reacting the material epoxy resin of an average molecular weight of 1,200, made from epibromohydrin and bis-(4-hydroxyphenyl)-dimethylmethane, with phenylenediamine in an amount sufficient to react with 20% of theoretical value of the epoxy groups in the material epoxy resin. The mixture was pressed under room temperature, placed between two smooth metal sheets, pressed again with the pressure of 60 kg./cm.$^2$ at 185° C., rapidly cooled and made into a film form. Its reaction rate constant for thermal degradation was 0.5%/min., indicating that the thus treated polyoxymethylene has a greatly improved thermal stability over the material polyoxymethylene.

*Example 4*

Two hundred (200) grams of dimethyletherified product of polyoxymethylene having an intrinsic viscosity of 1.43 and a reaction rate constant for thermal degradation of 1.1%/min. (222° C.) was added with 10.0 grams of a partially cured epoxy resin, which had been obtained by reacting an uncured resin having an average molecular weight of 700, produced from epichlorohydrin and bis-(4-hydroxyphenyl)-dimethylmethane, with p,p_-diamino-diphenylmethane in an amount sufficient to react with 70% of the theoretical value of the epoxy groups in said uncured epoxy resin.

After the partially cured epoxy resin was uniformly dispersed in the dimethyletherified product of polyoxymethylene, the dispersion was subjected to the same operations as in Example 3 and shaped into a film. The reaction rate constant for thermal degradation of the film was 0.2%/min., and thus proved the improvement in the thermal stability. No coloration was seen during the heat-shaping operations thereof.

*Example 5*

Into 200 grams of polyoxymethylene having an intrinsic viscosity of 2.75 and a reaction rate constant for thermal degradation of 3.8%/min. (222° C.), 3 grams of partially cured epoxy resin were uniformly mixed, said epoxy resin having been obtained by reacting an uncured resin having an average molecular weight of 1,000, produced from epichlorohydrin and dihydroxydiphenyl, with toluidine in an amount sufficient to react with 5% of the theoretical value of the epoxy groups in the uncured epoxy resin. After the mixture was pressed under normal temperature into a cylindrical form, it was formed into film as in Example 3. The reaction rate constant for thermal degradation of the product film was 1.3%/min., proving the improvement in its thermal stability.

*Example 6*

Into 200 grams of polyoxymethylene-diacetate having an intrinsic viscosity of 2.32 and a reaction rate constant for thermal degradation of 0.6%/min. (222° C.), 4 grams of partially cured epoxy resin were uniformly mixed, said epoxy resin having been obtained by reacting an uncured epoxy resin of an average molecular weight of 900 and of which starting materials are epichlorohydrin and bis-(4-hydroxyphenyl)-dimethylmethane, with piperazine in an amount sufficient to react with 30% of the theoretical value of the epoxy groups in the uncured epoxy resin.

After the mixture was pressed and moulded into a cylindrical form under room temperature, the same was extruded through a nozzle of 190° C. and 100 kg./cm.$^2$, to be made into fibers. The reaction rate constant for thermal degradation of the fiber was 0.1%/min. Thus it was confirmed that the thermal stability thereof was remarkably improved.

Thus having set forth the invention, what is claimed is:

1. A polymer blend which comprises at least one high molecular weight substance selected from the group consisting of polyoxymethylene, etherified polyoxymethylene and esterified polyoxymethylene and an epoxy resin obtained from reacting an epihalohydrin with a compound selected from the group consisting of bis-(4-hydroxyphenyl)-dimethylmethane, dihydroxy diphenyl, bis-(hydroxyphenyl)-methane, bis-(hydroxyphenyl)-ethane and p-bis-(hydroxyphenyl)-benzene in an amount of 0.5–20% by weight based on the high molecular weight substance, said epoxy resin having been partially cured with an amino group compound which contains at least two active amino hydrogen atoms in an amount sufficient to react with 2–80% of the epoxy groups contained in the uncured epoxy resin.

2. A composition according to claim 1 wherein the polymer is pulverized.

3. A composition according to claim 1 wherein the polymer is in a liquid state.

References Cited by the Examiner

UNITED STATES PATENTS 2,830,038  4/58  Pattison _____ 260—2

MURRAY TILLMAN, *Primary Examiner.*

LEON J. BERCOVITZ, *Examiner.*